Aug. 11, 1936.     C. V. AGGERS     2,050,250
HIGH VOLTAGE TESTING DEVICE
Filed March 23, 1935
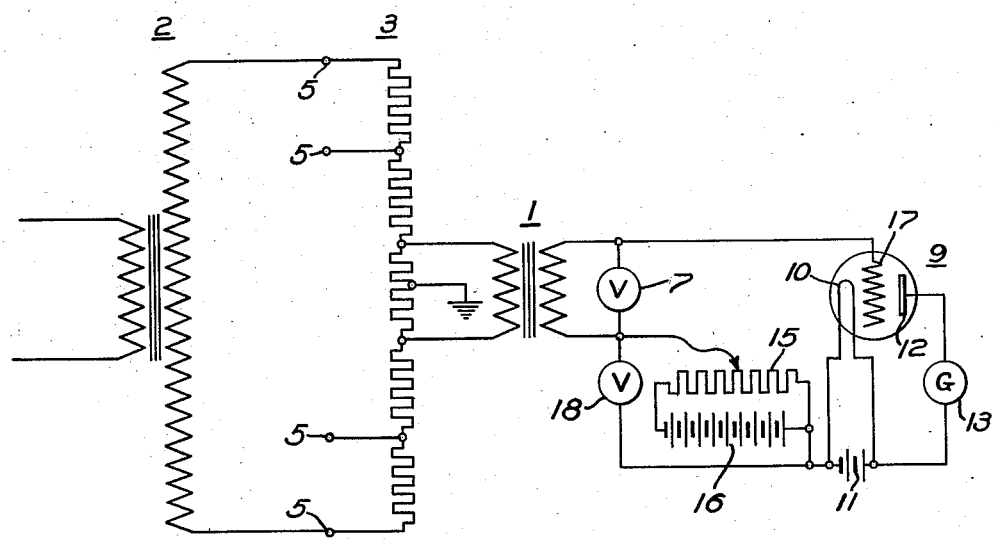
WITNESSES:
Q. J. Fitzgerald
G. O. Harrison
INVENTOR
Clair V. Aggers.
BY
ATTORNEY Patented Aug. 11, 1936

2,050,250

UNITED STATES PATENT OFFICE 2,050,250

HIGH VOLTAGE TESTING DEVICE

Clair V. Aggers, Forest Hills, Pa., assignor to Westinghouse Electric & Manufacturing Company, East Pittsburgh, Pa., a corporation of Pennsylvania Application March 23, 1935, Serial No. 12,561

4 Claims. (Cl. 175—183)

My invention relates to devices for measuring the effective voltage and crest voltage values of medium and high-voltage alternating-current apparatus. Although not limited thereto, my invention is particularly applicable to the measurement of such voltage values in connection with circuits and apparatus having high voltage regulation, such as the transformers used for energizing luminous tubes. Such transformers develop open-circuit secondary voltages of the order of 2 to 15 kv., but because of their high internal reactance, do not maintain these voltages under even moderate loads. It is, accordingly, necessary in measuring voltage quantities of these transformers, to maintain the burden imposed on the transformers at a low value.

If potential transformers are used to step down the voltage of the luminous tube transformers to a value suitable for measurement, it is necessary to provide undesirable complications for changing the transformation ratio in order to properly cover the necessary range of voltages. Furthermore, potential transformers for voltages of the order of 15 to 22 kv. are heavy, cumbersome and expensive. If it is attempted to substitute some form of impedance potentiometer for the potential transformers, the burden imposed by the potentiometer will, in general, be high enough to appreciably alter the open-circuit voltage characteristics of the transformer under test, if the volt-ampere output of the potentiometer is sufficient to produce operation of ordinary measuring instruments.

It is, accordingly, an object of my invention to provide a novel device for measuring effective-voltage and crest-voltage values which will be free from the objectionable features of the devices for this purpose known to the prior art.

Other objects of my invention will become evident from the following detailed description, taken in conjunction with the accompanying drawing in which the single figure is a diagrammatic view of a measuring device embodying my invention.

Referring to the drawing in detail, a low-voltage transformer 1, having special characteristics as will hereinafter be described, is connected to a luminous tube transformer 2 to be tested, by means of a plurality of high-resistance resistors 3. The resistors 3 are preferably connected to form a potentiometer having a grounded-connection at its mid-point, and a number of taps connected to suitable terminals 5. The taps are preferably so spaced as to provide a number of full-scale ranges suitable for the transformers to be tested. For example, these ranges may be 2, 6 and 15 kv.

The transformer 1 is preferably designed to have low core losses and very low exciting admittance. The core of this transformer is preferably made of finely laminated low-loss magnetic material, such as a suitable nickel-iron alloy known in the art, and is worked at comparatively low flux densities. The ratio of the transformer 1 is preferably such as to avoid excess insulation and to provide a secondary voltage of convenient value for measurement. In the practical embodiment of the invention, the transformation ratio may be 60 to 1, for example, with the high-voltage winding of the transformer 1 energized at 600 volts. The resistors 3 may have a total resistance value of the order of 30 to 100 megohms. I have found that for a specific transformer design following the requirements outlined above, the resistors 3 may conveniently have a total resistance of 64 megohms.

A high-impedance alternating-current voltmeter 7 is connected across the secondary winding of transformer 1 to measure the effective or root-mean-square voltage of the transformer 2 under test, and a triode 9 is provided for measuring the transformer peak or crest voltage.

The triode 9 is provided with a heater cathode 10 connected to a suitable A-source 11. The anode 12 of the triode 9 is preferably connected to the cathode 10 in series with a galvanometer 13, with or without a source of B-voltage included in the connection, depending upon the triode and galvanometer characteristics. In the circuit shown, the B-source is omitted.

A potentiometer resistor 15, connected to a suitable C-source or bias battery 16, is provided for adjustably biasing the grid 17 of the triode 9. A direct-current voltmeter 18 is connected across the output section of the potentiometer resistor 15 to respond to the bias applied to the grid circuit.

The operation of the above-described apparatus may be set forth as follows: To measure the crest voltage of the transformer 2, the potentiometer tap of the resistor 15 is adjusted to the minimum bias value at which the indication of the galvanometer 13 is zero. Under these conditions, the peak value of the positive wave of secondary voltage of the transformer 1 is balanced out by the direct-current bias, so that the total grid voltage pulsates from zero to some negative value without becoming positive.

Because of the absence of appreciable distortion and losses in the transformer 1, the secondary voltage which it develops is substantially a duplicate, as to wave form, of its primary voltage. The reading of the direct-current voltmeter 18 is, accordingly, an accurate measure of the secondary peak voltage developed by the transformer 2. It is, of course, necessary to provide a sinusoidal primary voltage source for the transformer 2, as harmonics of the supply voltage will affect the crest voltage readings.

It will be noted that the burden imposed by the above described apparatus depends almost entirely on the resistance-values of the resistors 3. For the value of 64 megohms given, the volt-ampere burden imposed on the secondary winding of transformer at 15 kv. is a little less than 4 volt-amperes. This compares quite favorably with the burden imposed by commercial potential transformers suitable to effect the entire voltage transformation.

I do not intend that the present invention shall be restricted to the specific structural details, arrangement of parts or circuit connections herein set forth as various modifications thereof may be effected without departing from the spirit and scope of my invention.

I claim as my invention:

1. In apparatus for measuring crest voltage values of high-voltage alternating-current circuits, a low-voltage transformer having a low-loss magnetic core designed for operation at low flux densities, a high impedance potentiometer for energizing said transformer in accordance with the alternating voltage to be measured, said potentiometer being designed to apply a small portion only of said alternating voltage to said transformer and having a mid-point connection to ground, and means for measuring the crest value of secondary voltage of said transformer.

2. In apparatus for measuring the crest voltage values of high-voltage alternating-current circuits, a low-voltage transformer having a low-loss magnetic core designed for operation at low flux densities, a high-resistance potentiometer for energizing said transformer in accordance with the alternating voltage to be measured, said potentiometer being designed to apply a small portion only of said alternating voltage to said transformer and having a mid-point connection to ground, said potentiometer having a plurality of taps for varying the ratio thereof, and means for measuring the crest value of secondary voltage of said transformer.

3. In apparatus for measuring the crest voltage values of high-voltage alternating-current circuits, a low-voltage transformer having a low-loss magnetic core designed for operation at low flux densities, a high-resistance potentiometer for energizing said transformer in accordance with the alternating voltage to be measured, said potentiometer being designed to apply a small portion only of said alternating voltage to said transformer, said potentiometer having a mid-point connection to ground and having a plurality of taps for varying the ratio thereof, a current responsive instrument, a triode having an input circuit responsive to the secondary voltage of said transformer and an output circuit connected to energize said instrument, adjustable direct-current bias means included in said input circuit, and means for indicating the magnitude of bias produced by said direct-current bias means.

4. The combination as defined in claim 3, in which the core is composed of finely laminated alloy of nickel and iron.

CLAIR V. AGGERS.